United States Patent
Johnson et al.

(10) Patent No.: US 11,067,279 B2
(45) Date of Patent: Jul. 20, 2021

(54) METHOD OF SELECTIVE COMBUSTOR CONTROL FOR REDUCED EMISSIONS

(71) Applicant: Siemens Aktiengesellschaft, Munich (DE)

(72) Inventors: Clifford E. Johnson, Orlando, FL (US); Weidong Cai, Oviedo, FL (US); Krishna C. Miduturi, Oviedo, FL (US); Ben Karanja, Orlando, FL (US); Michael Huth, Essen (DE); Werner Krebs, Mülheim an der Ruhr (DE); Mark Seifarth, Orlando, FL (US); Thomas Primke, Belmont, NC (US); Yohannes Ghermay, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 281 days.

(21) Appl. No.: 16/300,637

(22) PCT Filed: May 12, 2016

(86) PCT No.: PCT/US2016/032201
§ 371 (c)(1),
(2) Date: Nov. 12, 2018

(87) PCT Pub. No.: WO2017/196356
PCT Pub. Date: Nov. 16, 2017

(65) Prior Publication Data
US 2020/0309375 A1    Oct. 1, 2020

(51) Int. Cl.
*F23R 3/34* (2006.01)
*F02C 9/32* (2006.01)
(Continued)

(52) U.S. Cl.
CPC .............. *F23R 3/286* (2013.01); *F02C 7/228* (2013.01); *F02C 9/32* (2013.01); *F02C 9/34* (2013.01);
(Continued)

(58) Field of Classification Search
CPC .... F02C 9/34; F02C 9/32; F02C 7/228; F02C 7/22; F23R 3/34; F23R 3/343;
(Continued)

(56) References Cited

U.S. PATENT DOCUMENTS

| 5,551,228 A | 9/1996 | Mick et al. |
| 5,806,299 A | 9/1998 | Bauermeister et al. |

(Continued)

FOREIGN PATENT DOCUMENTS

| CN | 1043189 A | 6/1990 |
| CN | 1112997 A | 12/1995 |

(Continued)

OTHER PUBLICATIONS

PCT International Search Report and Written Opinion dated Feb. 24, 2017 corresponding to PCT Application No. PCT/US2016/032201 filed May 12, 2016.
(Continued)

*Primary Examiner* — Scott J Walthour
*Assistant Examiner* — Todd N Jordan

(57) ABSTRACT

A method, including: operating an industrial gas turbine engine having a plurality of combustor cans arranged in an annular array, each can having burner stages and a pilot burner arrangement having a premix pilot burner and a diffusion pilot burner; operating in asymmetric combustion, wherein at least one can is a warm can where respective burners stages are off and remaining cans operate as hot cans where respective burner stages are on; and while maintaining a constant rate of fuel flow to the pilot burner arrange-
(Continued)

| | | | Fuel Fractions at an Example Reduced Load | | | | | Normalized Flow Rates at the Example Reduced Load | | | |
|---|---|---|---|---|---|---|---|---|---|---|---|
| | | | Diffusion Pilot/Can | Premix Pilot/Can | Other Stage(s) | Diffusion Pilot/Pilot Arrangement | Premix Pilot/Pilot Arrangement | Each Combustor/ 12 Combustors | Diffusion Pilot | Premix Pilot | Pilot Arrangement |
| Uniform Combustion | Each Can (12) in Uniform Combustion | | 0.02 | 0.15 | On | 0.12 | 0.88 | 0.08 | 0.02 | 0.15 | 0.17 | A
| Asymetric Combustion | Transfer | Hot Cans (10) During Transfer | 0.01 | 0.12 | On | 0.06 | 0.94 | 0.09 | 0.01 | 0.13 | 0.14 | B
| | | Warm Cans (2) During Transfer | 0.60 | 0.40 | Off | 0.60 | 0.40 | 0.05 | 0.18 | 0.12 | 0.30 | C
| | Steady State Hot/Warm | Hot Cans (10) in Hot Mode | 0.01 | 0.12 | On | 0.06 | 0.94 | 0.09 | 0.01 | 0.03 | 0.14 | D
| | | Warm Cans (2) in Warm Mode | 0.20 | 0.80 | Off | 0.20 | 0.80 | 0.05 | 0.06 | 0.24 | 0.30 | E
| | | | 1 | 2 | 3 | 4 | 5 | 6 | 7 | 8 | 9 | | ment of the warm can, changing fuel fractions within the pilot burner arrangement of the warm can.

9 Claims, 3 Drawing Sheets

(51) Int. Cl.
  *F02C 9/34* (2006.01)
  *F23R 3/28* (2006.01)
  *F02C 7/228* (2006.01)
  *F23R 3/46* (2006.01)
(52) U.S. Cl.
  CPC ............... *F23R 3/34* (2013.01); *F23R 3/343* (2013.01); *F23R 3/346* (2013.01); *F23R 3/46* (2013.01); *F05D 2270/31* (2013.01); *F23N 2237/02* (2020.01); *F23N 2241/20* (2020.01)
(58) Field of Classification Search
  CPC .. F23R 3/346; F23R 3/46; F23R 2900/03343; F05D 2270/31; F23N 2241/20
  See application file for complete search history.

(56) References Cited

U.S. PATENT DOCUMENTS

| | | | |
|---|---|---|---|
| 6,092,362 A | 7/2000 | Nagafuchi et al. | |
| 7,051,533 B2* | 5/2006 | Baino | F23R 3/343 60/773 |
| 9,459,008 B2* | 10/2016 | Skipper | F23R 3/343 |
| 2002/0059799 A1 | 5/2002 | Lavie et al. | |
| 2004/0055306 A1 | 3/2004 | North et al. | |
| 2004/0255594 A1 | 12/2004 | Baino et al. | |
| 2005/0050899 A1* | 3/2005 | Little | F02C 7/228 60/773 |
| 2005/0097890 A1 | 5/2005 | Ikeda et al. | |
| 2005/0160739 A1 | 7/2005 | Cerny et al. | |
| 2005/0217276 A1 | 10/2005 | Colibaba-Evulet et al. | |
| 2009/0111063 A1 | 4/2009 | Boardman et al. | |
| 2009/0126367 A1* | 5/2009 | Chhabra | F02C 9/263 60/734 |
| 2014/0109586 A1 | 4/2014 | Ciani et al. | |
| 2014/0123651 A1* | 5/2014 | Smith | F23R 3/46 60/737 |
| 2014/0352321 A1 | 12/2014 | Haynes et al. | |
| 2020/0393131 A1* | 12/2020 | Schmitz | F23R 3/346 |

FOREIGN PATENT DOCUMENTS

| | | |
|---|---|---|
| CN | 1590734 A | 3/2005 |
| CN | 1601181 A | 3/2005 |
| CN | 1667318 A | 9/2005 |
| CN | 1676902 A | 10/2005 |
| CN | 1707080 A | 12/2005 |
| CN | 101334175 A | 12/2008 |
| CN | 101424405 A | 5/2009 |
| CN | 101424407 A | 5/2009 |
| CN | 102606314 A | 7/2012 |
| CN | 102913950 A | 2/2013 |
| CN | 103850796 A | 6/2014 |
| CN | 104566464 A | 4/2015 |
| CN | 104685298 A | 6/2015 |
| EP | 2600063 A2 | 6/2013 |
| JP | S6267240 A | 3/1987 |
| JP | H0828872 A | 2/1996 |
| JP | 2001021145 A | 1/2001 |
| JP | 2012007565 A | 1/2012 |

OTHER PUBLICATIONS

Qing Hua Da Xue Re Neng Gong Cheng Xi Dong, Gas turbines and gas : steam combined cycle unit, Thermal Engineering. Tsinghua University(Chinese Edition), Publisher: China Electric Power Press Information, ISBN 13: 9787508354002, Pub Date :Aug. 1, 2007 pp. 797.

Ciani, A., Eroglu, A., Guthe, F., Paikert, B., "Full-Scale Atmospheric Tests of Sequential Combustion", Proceedings of ASME Turbo Expo 2010: Power for Land, Sea and Air, GT 2010-22891, Jun. 14-18, 2010.

Langston, Lee S., Opdyke, George Jr., "Introduction to Gas Turbines for Non-Engineers", Global Gas Turbine News, vol. 37: 1997, No. 2.

* cited by examiner

FIG. 2

| | | | Fuel Fractions at an Example Reduced Load | | | | | Normalized Flow Rates at the Example Reduced Load | | | |
|---|---|---|---|---|---|---|---|---|---|---|---|
| | | | Diffusion Pilot/Can | Premix Pilot/Can | Other Stage(s) | Diffusion Pilot/Pilot Arrangement | Premix Pilot/Pilot Arrangement | Each Combustor/ 12 Combustors | Diffusion Pilot | Premix Pilot | Pilot Arrangement | |
| Uniform Combustion | | Each Can (12) in Uniform Combustion | 0.02 | 0.15 | On | 0.12 | 0.88 | 0.08 | 0.02 | 0.15 | 0.17 | A |
| Asymmetric Combustion | Transfer | Hot Cans (10) During Transfer | 0.01 | 0.12 | On | 0.06 | 0.94 | 0.09 | 0.01 | 0.13 | 0.14 | B |
| | | Warm Cans (2) During Transfer | 0.60 | 0.40 | Off | 0.60 | 0.40 | 0.05 | 0.18 | 0.12 | 0.30 | C |
| | Steady State Hot/Warm | Hot Cans (10) in Hot Mode | 0.01 | 0.12 | On | 0.06 | 0.94 | 0.09 | 0.01 | 0.03 | 0.14 | D |
| | | Warm Cans (2) in Warm Mode | 0.20 | 0.80 | Off | 0.20 | 0.80 | 0.05 | 0.06 | 0.24 | 0.30 | E |
| | | | 1 | 2 | 3 | 4 | 5 | 6 | 7 | 8 | 9 | |

FIG. 3

| | | | | | | | |
|---|---|---|---|---|---|---|---|
| | Hot/Warm Mode | Transfer Mode | | Uniform Combustion | Transfer Mode | | Hot/Warm Mode |
| | Asymmetric Combustion | | | Symmetric Combustion | Asymmetric Combustion | | |
| Warm Pilot Arrangement (WPA) | Maintain Warm Flow Rate 1 @ > Uniform Flow Rate 1 | Maintain Warm Flow Rate 1 | Reduce to Uniform Flow Rate 1 | Uniform Flow Rate 1 | Increase to Warm Flow Rate 1 | Maintain Warm Flow Rate 1 | Maintain Warm Flow Rate 1 @ > Uniform Flow Rate 1 — AA |
| Warm Diffusion Pilot Burner (WDPB) | Maintain Warm Flow Rate 2 @ >, =, < Uniform Flow Rate 2 | Increase to Transfer Flow Rate 2 @ > Uniform Flow Rate 2 by Shifting Fuel from Warm Premix Pilot Burner | Decrease to Uniform Flow Rate 2 | Uniform Flow Rate 2 | Increase to Transfer Flow Rate 2 @ > Uniform Flow Rate 2 | Decrease to Warm Flow Rate 2 by Shifting Fuel to Warm Premix Pilot Burner | Maintain Warm Flow Rate 2 @ >, =, < Uniform Flow Rate 2 — BB |
| Warm Premix Pilot Burner | Maintain Warm Flow Rate 3 @ > Uniform Flow Rate 3 (=WPAh/w−WDPBh/w) | Decrease to Transfer Flow Rate 3 by Shifting Fuel to Warm Diffusion Pilot Burner (=WPAt−WDPBt) | Adjust to Uniform Flow Rate 3 | Uniform Flow Rate 3 | Adjust to Transfer Flow Rate 3 | Increase to Warm Flow Rate 3 by Shifting Fuel from Warm Diffusion Pilot Burner (=WPAt−WDPBt) | Maintain Warm Flow Rate 3 @ > Uniform Flow Rate 3 (=WPAh/w−WDPBh/w) — CC |
| Hot Pilot Burner Arrangement | Maintain Hot Flow Rate 4 @ < Uniform Flow Rate 4 | Increase to Uniform Flow Rate 4 | | Uniform Flow Rate 4 | Decrease to Hot Flow Rate 4 | | Maintain Hot Flow Rate 4 @ < Uniform Flow Rate 4 — DD |
| Hot Diffusion Pilot Burner | Maintain Hot Flow Rate 5 @ >, =, < Uniform Flow Rate 5 | Adjust to Uniform Flow Rate 5 | | Uniform Flow Rate 5 | Adjust to Hot Flow Rate 5 | | Maintain Hot Flow Rate 5 @ >, =, < Uniform Flow Rate 5 — EE |
| | Preparing to Increase Power | | | | Preparing to Decrease Power | | |
| | 1 | 2 | 3 | 4 | 5 | 6 | 7 |

METHOD OF SELECTIVE COMBUSTOR CONTROL FOR REDUCED EMISSIONS

FIELD OF THE INVENTION

The invention relates to asymmetric combustion within an arrangement of combustor cans in a can annular industrial gas turbine to control emissions during less than baseload operations.

BACKGROUND OF THE INVENTION

Operation of industrial gas turbine engines is subject to emissions regulations that limit, inter alia, carbon monoxide (CO) levels. Conventional gas turbine engines are generally able to meet these requirement during part load operations down to a threshold may vary, depending on the machine. Below the threshold it is difficult, if not impossible, to meet the emissions requirements. In addition, the emission limits have been lowered in the past and are subject to being lowered in the future.

One method for reducing emissions during part load operation is described in U.S. Pat. No. 7,107,773 to Little. A can annular, industrial gas turbine engine described therein includes a plurality of combustor cans arranged in an annular array, where each combustor can includes one or more burner stages as well as a single pilot burner. To reduce emissions one or more combustor cans is operated during part load such that fuel to the pilot burner flows while fuel to the other stage or stages is substantially restricted.

Ever-lowering nitrous oxide (NOx) emissions limits have driven change in combustor technology resulting in combustor can designs having two pilot burners, where one of the pilot burners is a diffusion pilot burner like that present in Little, and the other is a premix pilot burner. Attaining and maintaining combustion in combustors such as these is challenging to the extent that combustion may not be possible if the teachings in Little are directly applied without additional control steps. Accordingly, there remains room in the art for improvements related to reducing CO emissions in premix pilot equipped combustion systems during part load combustion.

BRIEF DESCRIPTION OF THE DRAWINGS

The invention is explained in the following description in view of the drawings that show:

FIG. 2 is table showing fuel parameters in various operating modes.

FIG. 3 is a table showing flow rate logic in an example embodiment.

DETAILED DESCRIPTION OF THE INVENTION

Figure 1:
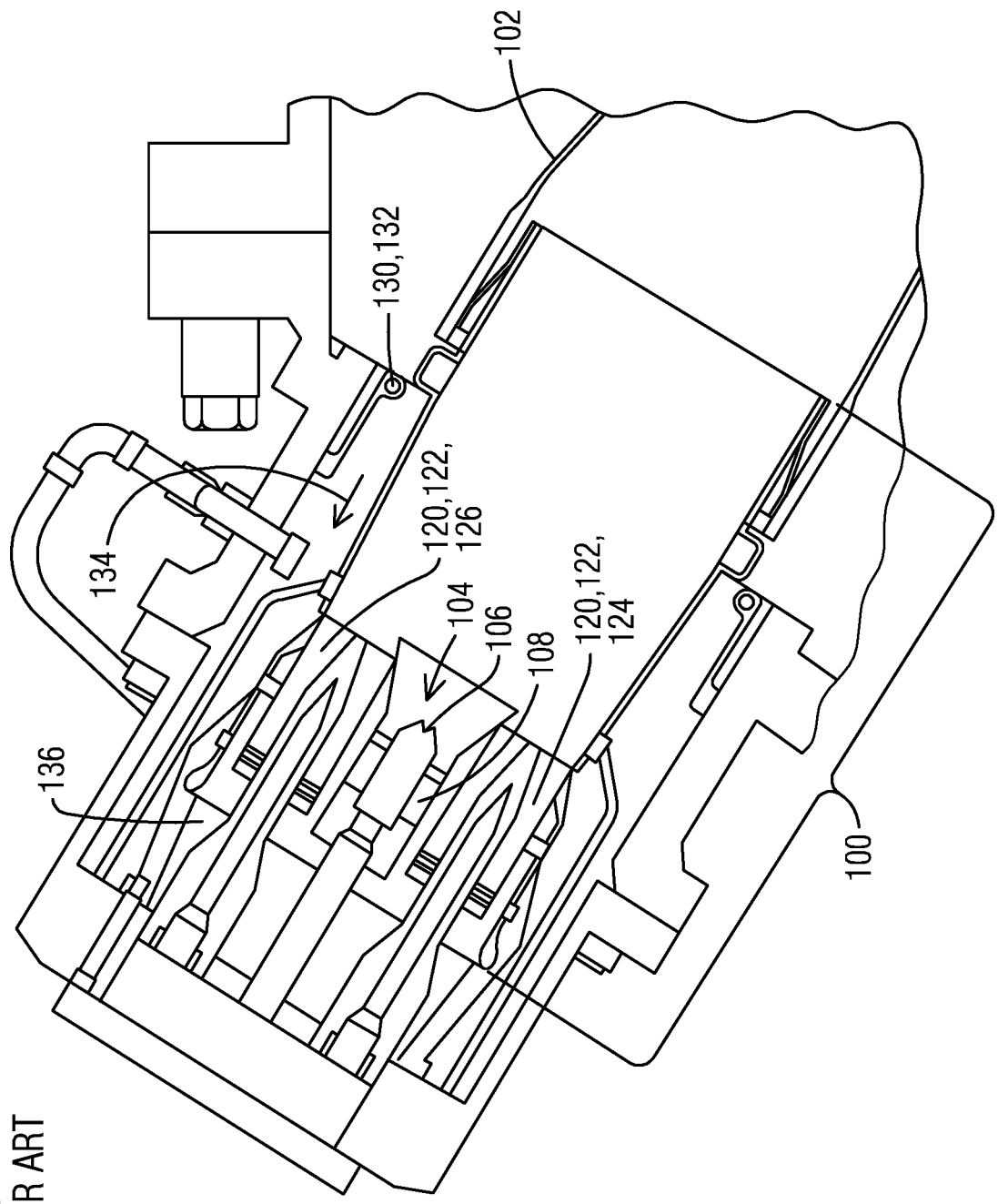
FIG. 1 is a partial sectional view of a combustor can of a prior art can annular industrial gas turbine engine.

The present inventors have devised a method of operating a can annular industrial gas turbine engine that enables reduced CO emissions at part load than is possible during uniform combustion. The engine includes a combustion arrangement having a plurality of combustor cans arranged in an annular array around a rotor shaft. Each combustor can includes a pilot arrangement having a diffusion pilot burner and a premix pilot burner, as well as at least one other burner stages. The method includes operating in an asymmetric combustion mode where one or more select combustor cans is operated in a warm mode and remaining combustor cans are operated in a hot mode.

As used herein, uniform combustion (e.g. symmetric combustion) refers a combustion arrangement where each combustor can operates under the same operating conditions as the other cans. Operating conditions refers to flame characteristics (temperature, size, pressure drop etc.) and associated fuel characteristics (e.g. fuel splits, fuel flow rates) within a particular can. Under uniform operating conditions, the diffusion pilot burner, the premix pilot burner, and at least one other stage are receiving fuel and contributing to a combustion flame therein. In an example embodiment, other stages include an A stage, a B stage, and a C stage. Typically, under uniform operating conditions, the A, B, and C stages are operating from base load down to a first percentage of base load. From about the first percentage down to a second percentage the A and B stages may operate, while the C stage will be off. From the second percentage down to a third percentage the A stage may operate while the B and C stages will be off. These percentages vary from one engine to another and within an engine based on other factors.

Asymmetric combustion refers a combustion arrangement where one or more cans is operating under different conditions than remaining cans. The terms hot and warm refer to a relative temperature of combustion gases exiting the respective can as compared to a temperature of combustion gases exiting a combustor can during uniform combustion at the same load. Accordingly, hot/warm combustion refers to a mode where some cans of the plurality of cans are operating as hot cans (e.g. in hot mode) while the remaining cans are operating as warm cans (e.g. in warm mode). A hot can refers to a can that sometimes operates under hot combustion conditions (i.e. hot mode) when compared to operating conditions present in the can operating under uniform combustion at the same load, while a warm can refers to a can that sometimes operates under warm combustion conditions (i.e. warm mode) when compared to operating conditions present in the can operating under uniform combustion at the same load. For example, at a given load and under uniform combustion, combustion gases exiting a can exhibit a uniform temperature. When in asymmetric combustion at the same load, combustion gases exiting hot cans exhibit a higher temperature than the uniform temperature, while combustion gases exiting the warm cans exhibit a lower temperature than the uniform temperature. When in hot operating conditions (in hot mode) a diffusion pilot burner, premix pilot burner, and at least one other stage of a hot can are receiving fuel and contributing to a combustion flame. When in warm operating conditions (in warm mode) a diffusion pilot burner and premix pilot burner of a warm can are receiving fuel and contributing to a combustion flame while all other stages are not receiving fuel, and therefore not contributing to a combustion flame.

A combustor can refers to each of a plurality of assemblies that generates a combustion flame and includes a housing inside which a plurality of main burners and a pilot burner arrangement reside. Of note, a combustor can may also be referred to as a burner by those of ordinary skill in the art, but not herein. As used herein, a main burner is a premix main burner having a swirler and an injector. A main burner may sometimes be referred to as a nozzle by those of ordinary skill in the art. Each pilot burner arrangement includes a premix pilot burner and a diffusion pilot burner. The premix pilot burner includes a swirler and an injector. A premix pilot burner may sometimes be referred to as a pilot by those of ordinary skill in the art. The diffusion pilot burner includes an injector that injects fuel into a flame.

When operating in uniform combustion, each can generates emissions, including CO emissions and NOx emissions, at a particular rate. The CO emission rate is termed can level CO emissions during uniform combustion, while NOx emission rate is termed can level CO emissions during uniform combustion. While the discussion herein focuses primarily on CO emissions, NOx emissions are also of interest and their control may influence tuning of the fuel control. When added together, the plurality of combustor cans produces total emissions (particularly CO emissions) at an associated rate (total CO emissions rate during uniform combustion). When operating in asymmetric combustion, hot cans generate emissions (particularly CO emissions) at a lesser rate per can than the can level CO emissions during uniform combustion. Warm cans generate emissions (particularly CO emissions) at a greater rate per can than the can level CO emissions during uniform combustion. However, when the emissions of the hot cans and the warm cans are added together, the total emissions during asymmetric combustion are equal to or less than total emissions during uniform combustion. Stated another way, the increased emissions generated by the warm cans are at least offset, if not overcome, by the decrease in emissions generated by the hot cans.

CO emissions are known to increase as the load decreases. Hence, CO emissions tend to limit the low end at which the engine may operate. As such, in operation, engine load may be decreased only until emissions CO emissions are at a maximum permissible limit. In the conventional systems, further reduction in the load was either not possible, or occurred but with emissions at a greater than desired level. As disclosed herein, switching from uniform combustion to asymmetric combustion can reduce emissions. Accordingly, once the emissions limits are reached using the conventional approach during uniform combustion, the combustion arrangement can be switched into asymmetric combustion. This reduces emissions at the same load, which enables reduced emissions at that load. The reduced emission enables a further reduction in the load of the engine while maintaining emissions compliance. Consequently, as a result of the material disclosed herein, an engine may operate at lower load levels while maintaining emissions compliance.

Accordingly, in an example embodiment, the method includes delivering fuel to the pilot burner arrangement of the warm can at a rate that is different than a rate at which fuel is delivered to the pilot arrangement of the hot cans in order to reduce total emissions. In an example embodiment, the per/can fuel flow rate to the pilot burner arrangement in the hot cans is less than the per/can fuel flow rate to the pilot burner arrangements in the warm cans. This enables reduced emissions in the hot cans that offset increased emissions in the warm cans.

It is further understood that the diffusion burner provides flame stability, but generates relatively more emissions than the premix burner of a given pilot arrangement, and is the primary emissions generator per can as well as in the combustion arrangement. Conversely, the premix pilot burner provides relatively less emissions, but is also relatively less stable. Having a pilot arrangement with both types of pilot burners enables optimization of stability versus emissions not possible with a pilot arrangement not having both types of pilot burners.

Accordingly, in another example embodiment, the distribution of fuel (the fuel split) within the pilot arrangement may be shifted from one of the pilot burners to the other. For example, for a given amount of fuel being delivered to the pilot burner arrangement, there may exist two modes. In a first mode flame stability may be the primary concern. In a second mode reduced emissions may be the primary concern. The fuel split between the two pilot burners in each of these modes may be different. In a flame stability mode more fuel may be delivered to the diffusion pilot burner than may be delivered to the diffusion pilot burner in the reduced emissions mode. By adjusting the fuel split within the pilot burner arrangement in this way, a balance between flame stability and emissions levels may be achieved. In an example embodiment, the total flow to the plurality of combustion cans remains the same during the transition between flame stability mode and reduced emissions mode, which enables maintaining the same engine load during the transition.

The Inventors discovered that initiating a transition from uniform combustion to asymmetric combustion or the reverse can create instabilities in the warm combustor cans transitioning. In certain instances, it may be desirable to reduce or eliminate the induced instabilities. The Inventors realized that the diffusion pilot burner and the premix pilot burner could be separately controlled and capitalized on that fact. This enabled them to devise a scheme that smoothes the transition into the warm mode, where the scheme relies first on the primary benefit of the diffusion pilot burner, e.g. flame stability, and then relies on the primary benefit of the premix pilot burner to achieve the reduced emissions preferred for steady state not/warm operation. In the transfer mode flame stability is the primary concern, and the fuel split provides enough fuel to the diffusion pilot burner to overcome and/or prevent the induced instabilities. Once the flame stabilizes, the fuel split within the pilot burner arrangement changes to favor reduced emissions by reducing an amount of fuel being delivered to the diffusion pilot burner. In an example embodiment, this change in the fuel split occurs while the flow of fuel to the pilot burner arrangement remains the same. The same applies when transitioning from steady state hot/warm combustion to uniform combustion.

It is understood that during the flame stabilizing mode emissions may be even greater than during warm combustion, but this is a transient state that is made up for over time by the reduction in total emissions that occurs when operating in hot/warm mode. Accordingly, asymmetric combustion includes operation in steady-state hot/warm mode, and any transfer modes leading to and from steady-state hot/warm combustion where the A, B, and C stages are off. Steady state hot/warm combustion includes, but is not limited to, those states where total emissions are less than that of uniform combustion at the same load. Transfer modes may include states where total emissions are more than that of uniform combustion at the same load.

In an example embodiment, the total flow to the plurality of combustion cans remains the same in the transfer mode and the steady state of asymmetric combustion as in uniform combustion during the adjustment. This enables maintaining the same load during the transition and during steady state hot/warm combustion as during uniform combustion.

FIG. 1 is a partial sectional view of a combustor can 100 of a prior art can annular industrial gas turbine engine. A combustion arrangement includes a plurality of the combustor cans arranged in an annular array around a rotor shaft of the engine. The plurality of combustor cans may include any number of cans. Example embodiments range from six (6) combustor cans to twenty-four (24). Each combustor can 100 exhausts combustion gases into a respective transition duct 102 that leads to an inlet of a turbine section. Each combustor can 100 includes a premix pilot arrangement 104 including a diffusion pilot burner 106 and a premix pilot burner 108. Premix main burners 120 are arranged in an annular array around the pilot burner arrangement 104 and are divided into A stage 122 and B stage 124. In an example embodiment, A stage premix main burners 126 alternate with B stage premix main burners 128. A fuel ring 130 designated C stage 132 is disposed upstream with respect to a flow of compressed air 134 flowing into an inlet 136 of the combustor can 100.

FIG. 2 is table showing fuel parameters in an example embodiment at various operating modes at an example reduced load. Columns in FIG. 2 are labelled 1-7 and rows are labeled A-E and these labels are used below to identify individual cells. FIG. 3 is a table showing flow rate logic in an example embodiment. Columns in FIG. 3 are labelled 1-7 and rows are labeled AA-EE and these labels are used below to identify individual cells. The discussion below refers to both FIGS. 2 and 3.

The transition between uniform conditions and hot/warm conditions may be used when reducing and/or when increasing power. When reducing power, once a given load is reached under uniform combustion conditions, the plurality of combustor cans may transition from uniform combustion to steady state hot/warm combustion at the given load. The given load may be any part load. In an example, not meant to be limiting, the given load is not more than 50% of base load. The given load may be selected to be a load where emissions, e.g. CO emissions, reach a maximum permissible level. Once the transition is made to hot/warm mode, emissions, e.g. CO emissions, are reduced, permitting further reduction in power. Consequently, after the transition, the load may be further reduced further while in hot/warm combustion. Similarly, when increasing power, once a given load is reached in hot/warm combustion, the plurality of combustor cans may transition from steady state hot/warm combustion to uniform combustion, after which power may be increased further.

In an example embodiment, the total fuel flow to the plurality of combustor cans remains the same in uniform combustion and asymmetric combustion during the transition and at least until steady state hot/warm combustion is attained. Fuel to stages A, B, and C in the warm cans is stopped and redistributed to the hot cans. In this example embodiment, when transitioning from uniform combustion to hot/warm combustion a transfer mode is used for the warm cans. The transfer mode overcomes instabilities that may be induced by a change in fuel flow to the A, B, and C stages. As can be seen by looking at cells A7 and then C7 of FIG. 2, during the transition from uniform combustion to hot/warm combustion, the fuel rate to the diffusion pilot burner of the warm can increases. Subsequently, the fuel rate decreases, as can be seen looking at cells C7 and then E7. This process is shown in cells BB4 to BB7 of FIG. 3.

In this example embodiment of FIG. 2, the fuel rate to the diffusion pilot burner of the warm can drops after the initial increase, but still remains above a level present in the warm can during uniform combustion. However, as can be seen in cells BB1 and BB7 of FIG. 3, the fuel flow rate to the diffusion pilot burner in the warm can during hot/warm operation can may be less than, equal to, or greater than the fuel flow rate to the diffusion pilot burner of the warm can during uniform combustion at the same load. For example, at very low loads (e.g. 5-15%) the fuel flow rate to the diffusion pilot burner of the warm can may be lower during hot/warm combustion than during uniform combustion at the same load due to various other factors that may alter/invert these relationships. Nonetheless, during the transfer function the fuel flow rate to the diffusion pilot burner of the warm can increases and then decreases by some amount. The same process happens in reverse when transitioning from steady state hot/warm combustion to uniform combustion. That is, the rate of fuel flow to the diffusion pilot burner of the warm can increases during transfer, (cells E7 to C7) and then decreases (calls C7 to A7) in uniform combustion. This process is shown in cells BB1 to BB4 of FIG. 3.

This increased fuel flow to the diffusion pilot burner of the warm can during the transfer is the flame stability mode that mitigates or overcomes induced instability caused by halting fuel flow to the A, B, and C stages of the warm can when transitioning to hot/warm mode. Once conditions calm, the transfer mode shifts fuel from the diffusion pilot burner to the premix pilot burner of the warm can, thereby entering the reduced emissions mode that occurs in the warm can during steady state hot/warm combustion. Likewise, when going from hot/warm to uniform combustion the transfer mode mitigates or overcomes induced instability cause by initiating fuel flow to the A, B, and C stages in the warm can.

The A, B, and C stages in the warm can may be closed simultaneously when going from uniform combustion to asymmetric combustion, and opened simultaneously when going from asymmetric combustion to uniform combustion to minimize combustion instabilities (e.g. high frequency dynamics). The increase in fuel flow to the diffusion pilot burner in the warm can in the transfer mode may occur before ceasing or starting flow to the A, B, and C stages so that greater stability is established before instability-inducing actions are initiated. Alternately, the increase in fuel flow to the diffusion pilot burner in the warm can in the transfer mode may occur concurrent with ceasing or starting flow to the A, B, and C stages so that stability is increased as instability-inducing actions occur.

In this example embodiment, the flow rate to the pilot burner arrangement of the warm can increases during the transfer from uniform combustion to hot/warm combustion to accommodate the increase in flow rate to the diffusion pilot burner of the warm can. This can be seen in the difference between cell A9 and cells C9 and E9, the latter of which are greater. This process is shown in AA5 and BB5 of FIG. 3. In an example embodiment, the fuel flow rate to the pilot burner arrangement in the warm can subsequently remains constant when the fuel split within the pilot burner arrangement of the warm can is changed. This can be seen in cells C9 and E9 of FIG. 2, which are the same, while cells C7 and C8 are different than cells E7 and E8. This can also be seen in cells C4 and C5 and cells E4 and E5, which show the different splits in transfer mode versus steady state hot/warm combustion. This process is shown in cell AA6 and BB6 of FIG. 3.

In this example embodiment of FIG. 2, the fuel rate to the premix pilot burner of the warm can initially drops and then increases during the transfer from uniform combustion to hot/warm combustion. This can be seen in the difference between cells A8 and cells C8 and E8 of FIG. 2. However, as can be seen in cell CC7 of FIG. 3, the fuel flow rate to the premix pilot burner of the warm can operating in hot/warm combustion may be greater than, less than, or equal to the fuel flow rate of the premix pilot burner of the warm can at uniform combustion. Very low loads (e.g. 5-15%) may alter/invert these relationships due to various other factors. Nonetheless, during the transfer function the fuel flow rate to the premix pilot burner of the warm can will increase when fuel is being transferred from the diffusion pilot burner to the premix pilot burner during transition to hot/warm combustion. This can be seen in cell CC6 of FIG. 3. Likewise, during the transfer function the fuel flow rate to the premix pilot burner of the warm can will decrease when fuel is being transferred from the premix pilot burner to the diffusion pilot burner during the transition from hot/warm combustion to uniform combustion. This can be seen in cell CC2 of FIG. 3.

Fuel flows in the hot cans also change when transitioning between uniform combustion and hot/warm combustion. A, B, and C stage fuel not used in the warm cans during hot/warm combustion is redirected to the hot cans during hot/warm combustion. The fuel flow to the diffusion pilot burner of the hot can decreases when going from uniform combustion to hot/warm mode as can be seen by the decrease in value from cell A7 to cells B7 and D7 of FIG. 2, the latter of which are less. This process can be seen in cell EE5/6 of FIG. 3. The reverse is true when transitioning from hot/warm combustion to uniform combustion, which can be seen in cell EE2/3 of FIG. 3. The fuel flow to the pilot burner arrangement of the hot can also decreases to accommodate the decrease in flow to the diffusion pilot burner of the hot can during hot/warm combustion. This can be seen in the difference between cells A9 and cells B9 and D9, the latter of which are less. This process can be seen in cell DD5/6 of FIG. 3. The reverse is true when transitioning from hot/warm combustion to uniform combustion, which can be seen in cell DD2/3 of FIG. 3.

As a general rule, the flow rate to the pilot burner arrangement of the hot can during hot/warm combustion will be less than the flow to the same during uniform combustion. This, in turn, means that the flow rate to the pilot burner arrangement of the hot can during hot/warm combustion will generally be less than the flow rate to the pilot burner arrangement of the warm can during hot/warm combustion because, as detailed above, the latter is increased in transfer mode and during hot/warm combustion. Pilot burner arrangements are responsible for a substantial portion of emissions. Hot cans operating in hot/warm combustion have reduced emissions of a certain amount due to the decreased flow of fuel in hot mode, while warm cans in hot warm combustion have increased emissions of another amount due to the increase flow of fuel in the warm mode. By ensuring the aggregate reduction in emissions of the hot cans exceeds the aggregate increase in emissions of the warm cans, total emissions of the plurality of combustor cans are reduced.

An example method includes: operating an industrial gas turbine engine comprising a plurality of combustor cans arranged in an annular array, each can comprising burner stages and a pilot burner arrangement comprising a premix pilot burner and a diffusion pilot burner; and transitioning from uniform combustion mode among the plurality of combustor cans to hot/warm combustion at given load, where at least one can operates as a warm can in warm combustion and remaining cans operate as hot cans in hot combustion. The transitioning comprises: maintaining a same total fuel flow to the plurality of combustor cans as occurs during uniform combustion; ceasing fuel flow to the burner stages of the warm cans; establishing an increased rate of fuel flow to the diffusion pilot burner of the warm can; establishing an increased rate of fuel flow to the pilot burner arrangement based on the increased rate of fuel flow to the diffusion pilot burner, and while maintaining the increased rate of fuel flow to the pilot burner arrangement of the warm can, changing fuel fractions within the pilot burner arrangement of the warm can to reach fuel fractions used during warm combustion.

The example method may further comprise: changing the fuel fractions comprising decreasing the diffusion pilot burner's fuel fraction.

The example method may further comprise: increasing a rate of fuel flow to a respective pilot burner arrangement of each warm can from a rate of flow that occurs during uniform combustion to an increased rate of flow to each pilot burner arrangement in the warm cans that occurs during warm combustion.

The example method may further comprise: reducing a rate of fuel flow to a respective diffusion burner of each hot can from a rate of fuel flow that occurs during uniform combustion to a reduced rate of fuel flow to each diffusion pilot burner that occurs in the hot cans during hot combustion.

The example method may further comprise: reducing a rate of fuel flow to a respective pilot burner arrangement of each hot can from a rate of fuel flow that occurs during uniform combustion to a reduced rate of fuel flow to each pilot burner arrangement that occurs in the hot cans during hot combustion.

The example method may further comprise: delivering the fuel flow to the pilot burner arrangement of the warm can during warm combustion at the increased rate established during the transitioning.

The example method may further comprise: generating increased CO emissions per warm can during warm combustion than is generated per can during uniform combustion; generating decreased CO emissions per hot can during hot combustion than is generated per can during uniform combustion; and ensuring that total CO emissions during hot/warm combustion is less than or equal to total CO emissions generated per can during uniform combustion.

The example method may further comprise: generating increased CO emissions per warm can during warm combustion than is generated per can during uniform combustion; and producing more total CO emissions during the transitioning than during uniform combustion.

There may be any number of hot cans and any number of warm cans in hot/warm combustion. In an embodiment the number is selected so the total emissions in hot/warm mode are less than the total emissions during uniform combustion at the same load. In an example embodiment, there may be one, two, or three warm cans, with the remainder of the cans being hot cans. In an example embodiment, there may be one warm can, then two, then three. In this way there may be plural hot/warm modes, and one hot/warm mode may lead to another hot/warm mode. These hot/warm modes may occur sequentially as engine load is reduced or they may occur at a given load to reduce emissions, or a combination thereof. In an example embodiment, the flow rate to the diffusion pilot burner arrangement of each warm can remains the same regardless of the number of warm cans. For example, as shown in cell E9 of FIG. 2, the flow rate to each warm can of two warm cans is 0.3. If a third can enters hot/warm mode, then all three warm cans would have the same flow rate of 0.3 each.

In asymmetric combustion a location of the warm can may be selected such that when there are two warm cans they are adjacent, or they are separated from each other by at least one hot can. Alternately, the warm cans may be located opposite each other in the annulus of combustors (e.g. 180 degrees apart), or they may be located anywhere in between. When there are three or more warm cans they may be distributed evenly about the annulus, although this is not necessary.

Asymmetric combustion generates various other effects that may be addressed. For example, under uniform combustion, as a turbine rotor blade moves through its sweep it will experience a mild temperature variation as it moves from a hottest location, which may be directly downstream of a combustor, to a coolest location, which may be between adjacent combustors. However, during hot/warm combustion, combustion gases exiting hot cans are hotter than during uniform combustion, while combustion gases exiting warm cans are cooler than during uniform combustion. Consequently, the hottest temperatures are higher and the lowest temperature are lower than during uniform combustion, making for a greater temperature range. This is a monitored value and the greater range present in hot/warm operation may require changing alarm set points or deactivation of the respective alarm. If two warm cans were to be placed adjacent to each other the blade would likely experience greater cooling in an associated part of its sweep. Hence, it may be beneficial to separate the warm cans to minimize the increase in the temperature range during hot/warm operation.

In addition, compressed air normally distributes itself evenly among the combustors during uniform combustion. However, during asymmetric combustion differing static pressures present in the hot and warm cans may cause the incoming compressed air to flow asymmetrically to the cans. For example, more compressed air may flow to the warm cans. This would lean out the ratio in the warm can, which would decrease the temperature of the combustion gases exiting the warm cans. Likewise, this would enrich the ratio in the hot cans, which would further increase the temperature of the combustion gases exiting the hot cans. This effect may further increase the temperature spread discussed above, and the effect is greater as the number of warm cans increases. Under certain circumstances the temperature of the combustion gases exiting the hot cans may approach or even exceed maximum permissible temperatures. In this case the average exhaust temperature may need to be reduced to ensure engine materials operate within acceptable limits. One way to decrease the average combustion temperature includes opening inlet guide vanes.

Conventional combustion arrangements may include one fuel supply manifold (ring) for each of the A, B, and C stages, a manifold for the diffusion pilot burner, and a manifold for the premix pilot burner. To enable individual control of the stages and pilot burners necessary to implement the above control, additional plumbing may be installed. This may range up to and including as much as a controllable valve for each stage and each pilot burner of each can, which would enable complete control of every aspect of the fuel distribution. Alternately, lines and control valves may be optimized to provide only the amount of control necessary to enable the intended schemes. For example, if only three warm cans are envisioned, the lines and valving necessary to halt flow to the A, B, and C stages may be installed for the three warm cans.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of operating an industrial gas turbine during a transition from a uniform combustion mode to a hot/warm combustion mode, the industrial gas turbine comprising:
   combustor cans arranged in an annular array, each combustor can comprising:
     a burner stage; and
     a pilot burner arrangement, each pilot burner arrangement comprising:
       a premix pilot burner; and
       a diffusion pilot burner;
   the method comprising:
   operating the industrial gas turbine in the uniform combustion mode, wherein in the uniform combustion mode each combustor can operates under the same operating conditions, wherein combustion gases exiting the combustor cans exhibit a uniform temperature;
   operating the industrial gas turbine in a transfer combustion mode during the transition from the uniform combustion mode to the hot/warm combustion mode; and
   operating the industrial gas turbine in the hot/warm combustion mode, wherein the hot/warm combustion mode is an asymmetric combustion mode, wherein at least one combustor can is a warm combustor can that produces warm combustion and the remaining combustor cans are hot combustor cans that produce hot combustion, wherein combustion gases exiting the hot combustor cans exhibit a higher temperature than the uniform temperature and combustion gases exiting the at least one warm combustor can exhibit a lower temperature than the uniform temperature;
   the transfer combustion mode comprising:
   initially increasing a rate of fuel flow to the diffusion pilot burner in the at least one warm combustor can;
   stopping fuel flow to the burner stage in the at least one warm combustor can; and
   subsequently decreasing the rate of fuel flow to the diffusion pilot burner in the at least one warm combustor can while maintaining a same total fuel flow to the pilot burner arrangement in the at least one warm combustor can by increasing a rate of fuel flow to the premix pilot burner in the at least one warm combustor can.

2. The method of claim 1, the transfer combustion mode further comprising:
   maintaining a total fuel flow to the combustor cans equal to a total fuel flow to the combustor cans during the uniform combustion mode.

3. The method of claim 1, the transfer combustion mode further comprising:
   decreasing a rate of fuel flow to each diffusion pilot burner in the hot combustor cans from a rate of fuel flow that occurs during the uniform combustion mode to a reduced rate of fuel flow that occurs during the hot/warm combustion mode.

4. The method of claim 1, wherein:
   a rate of fuel flow to the pilot burner arrangement of the at least one warm combustor can is higher in the hot/warm combustion mode than in the uniform combustion mode.

5. The method of claim 1, the transfer combustion mode further comprising:
   decreasing a rate of fuel flow to each pilot burner arrangement of the hot combustor cans from a rate of fuel flow that occurs during the uniform combustion mode to a decreased rate of fuel flow that occurs during the hot/warm combustion mode.

6. A method of operating an industrial gas turbine during a transition from a hot/warm combustion mode to a uniform combustion mode, the industrial gas turbine comprising:

combustor cans arranged in an annular array, each combustor can comprising:
a burner stage; and
a pilot burner arrangement, each pilot burner arrangement comprising:
a premix pilot burner; and
a diffusion pilot burner;
the method comprising:
operating the industrial gas turbine in the hot/warm combustion mode, wherein the hot/warm combustion mode is an asymmetric combustion mode, wherein at least one combustor can is a warm combustor can that produces warm combustion and the remaining combustor cans are hot combustor cans that produce hot combustion, wherein combustion gases exiting the hot combustor cans exhibit a higher temperature than a uniform temperature and combustion gases exiting the at least one warm combustor can exhibit a lower temperature than the uniform temperature;
operating the industrial gas turbine in a transfer combustion mode during the transition from the hot/warm combustion mode to the uniform combustion mode; and
operating the industrial gas turbine in the uniform combustion mode, wherein in the uniform combustion mode each combustor can operates under the same operating conditions, wherein combustion gases exiting the combustor cans exhibit the uniform temperature;
the transfer combustion mode comprising:
initially increasing a rate of fuel flow to the diffusion pilot burner in the at least one warm combustor can while maintaining a same total fuel flow to the pilot burner arrangement in the at least one warm combustor can by decreasing a rate of fuel flow to the premix pilot burner in the at least one warm combustor can;
starting fuel flow to the burner stage in the at least one warm combustor can; and
subsequently decreasing the rate of fuel flow to the diffusion pilot burner in the at least one warm combustor can.

7. The method of claim 6, the transfer combustion mode further comprising:
increasing a rate of fuel flow to each diffusion pilot burner in the hot combustor cans from a rate of fuel flow that occurs during hot combustion to an increased rate of fuel flow that occurs during the uniform combustion mode.

8. The method of claim 6, wherein:
a rate of fuel flow to the pilot burner arrangement of the at least one warm combustor can is higher in the hot/warm combustion mode than in the uniform combustion mode.

9. The method of claim 6, the transfer combustion mode further comprising:
increasing a rate of fuel flow to each pilot burner arrangement of the hot combustor cans from a rate of fuel flow that occurs during hot combustion to an increased rate of fuel flow that occurs during the uniform combustion mode.

\* \* \* \* \*